T. T. Fergusson.

Tanning Apparatus.

Nº 23,360. Patented Mar. 29, 1859.

Witnesses.

Inventor:
Thos. T. Fergusson

UNITED STATES PATENT OFFICE.

THOMAS T. FERGUSSON, OF NEW YORK, N. Y.

TANNING HIDES AND SKINS.

Specification of Letters Patent No. 23,360, dated March 29, 1859.

*To all whom it may concern:*

Be it known that I, THOMAS T. FERGUSSON, of the city, county, and State of New York, have invented a new and useful Improvement in the Method of Tanning Hides and Skins; and I do hereby declare that the following is a full, clear, and exact description of my said invention, reference being had to the accompanying drawing, in which—

Figure 1:
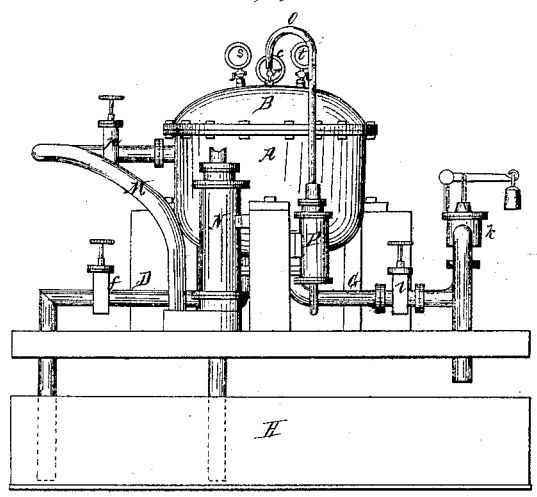
Figure 2:
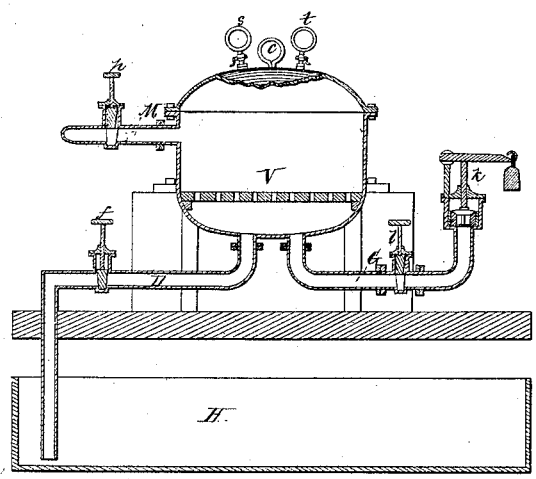

Figure 1 represents a side elevation of my apparatus, and Fig. 2 a vertical longitudinal section of the same through the center of the vacuum chamber.

My invention consists in impregnating hides and skins with a suitable liquid by a filtration of the liquid through the same while subjected to a sustained and regulated hydraulic pressure in a vacuum chamber previously exhausted.

The apparatus which I have devised for carrying my invention into effect is represented in the accompanying drawing, and consists mainly of a vacuum chamber to receive the articles to be acted upon, a receptacle or vat for the liquid, and of pumps by which the vacuum chamber is exhausted of air and charged with the liquid.

The vacuum chamber A is, in the present instance, of cylindrical form, with a dishing top and bottom to enable it the better to sustain the pressure to which it is subjected. It should be formed of some material which is not affected injuriously by the liquids used in the process; or it should be lined with such a material, as for example, with copper, when the chamber is to be used for tanning leather with a liquid containing vegetable tannin. The top B of the chamber is movable to permit of its withdrawal when the hides are inserted into or withdrawn from the chamber; it is fitted to the chamber, and is secured thereto by bolts; it is also provided with a ring $c$ to which hoisting tackle can be applied for the purpose of lifting it from and applying it to the chamber. The bottom of the chamber is connected by a pipe D with the reservoir or vat of tanning liquid, which in this instance is represented as situated beneath the floor of the room in which the vacuum chamber is located, and this pipe is fitted with a suitable valve or stop cock, $f$. The bottom of the vacuum chamber is also fitted with a second pipe G which communicates with the vat H, and is fitted with a weighted valve $k$ of the form of an ordinary safety valve. This pipe is also fitted with a stop cock or valve $l$, by which the flow of air or liquid through it can be prevented. The upper part of the vacuum chamber is connected by a pipe M with a force pump N, which is arranged as to draw the liquid from the vat and force it into the vacuum chamber under any suitable pressure, and the top of the chamber is connected by a pipe O with an exhausting or air pump P. The pipes leading from the vacuum chamber to these pumps are each fitted with a suitable stop cock or valve, $p$ and $r$, so that either pump may be used separately. I have also placed upon my vacuum chamber suitable vacuum and pressure gages, $s$ and $t$, to indicate pressure within.

When the apparatus thus described is used for tanning hides or skins, the tanning liquid which may be a decoction of bark, is placed in the vat H the cover of the vacuum chamber is removed and the hides or skins, previously prepared in the usual manner for tanning, are placed in it upon a perforated plate V, near its bottom; as the hides are put into the chamber each is separated from the adjacent hides by sheets of hair cloth, or by bundles or by perforated frames, so that the hides do not touch, and that the tanning liquid may have free access to them. When the chamber is filled the cover is applied and secured by the screw bolts, and before applying it a gasket of rubber or other suitable material should be placed upon the rim of the chamber so as to pack the joint between the cover and the chamber. The exhaust pipe O is then connected with the chamber, the valves $f$, $l$, $p$, of the three pipes D, G, M are closed, and the air pump is operated to exhaust the chamber and the hides therein of air. In order to obtain the best results this exhaustion should be effected as completely as the construction of the apparatus will permit. When the limit of exhaustion has been reached as indicated by the vacuum gage, the stop cock $f$, in the pipe D leading from the vat H, is opened to permit the tanning liquid to fill the vacuum chamber, and when this has been accomplished the valve is closed. The weight upon the escape valve $k$ should then be adjusted (if this has not been done previously) to the degree of sustained pressure under which the exhausted hides are to be subjected to the action of the current of liquid. The valves $p$ in the pipe leading to the force pump, and the valve $l$ in the exit pipe are now opened, and the force pump is put in operation to force the liquid into the upper part of the vacuum chamber. As soon as the pressure caused by this operation is sufficient to lift the weighted valve $k$, the continued operation of the force pump causes the tanning liquid to pass in a current through the hides and out of the exit pipe, so that the hides deprived of air are subjected to the action of a current of tanning liquid under hydraulic pressure, sustained and regulated by the operation of the weighted valve by which means their impregnation with a sufficient amount of tannin is speedily effected.

The pressure under which the operation is effected may be varied as circumstances require, but I have found that a pressure of about eighty pounds to the square inch is a suitable pressure for the purpose.

The mode of operation or process of impregnation herein set forth is not confined to the tanning of hides with a tanning liquid, as it may be used with great advantage for other purposes, as for example the impregnation of skins with oil or oleaginous liquids for the purpose of making chamois leather or buff leather, or for the impregnation of partially tanned hides with oil for harness leather. And the impregnation may be effected wholly with the same liquid or with a succession of liquids of different strengths or qualities as is customary in the process of tanning leather.

Having thus described my invention it is proper to state that I am aware that skins have been tanned by a vacuum process.

I am also aware that the impregnation has been effected by hydraulic pressure; but I am not aware that the impregnation of such articles has been effected by subjecting them in a vacuum chamber to the action of a current of the impregnating liquid while under sustained and regulated hydraulic pressure so as to effect the filtration of the liquid through the hides after previous exhaustion, and this mode of operation differs from those which have preceded it in the respect that while in them the impregnation has been effected by the action of a current of liquid permitted to act upon the skins without a previous exhaustion, and hence not in a vacuum chamber; or has been effected by submitting the hides or skins after exhaustion to the pressure of a liquid either in a quiescent state, or under the irregular and unsustained pressure due to the changing of the liquid without means to graduate its exit to the supply of new liquid; it is effected by my process in a current, by which fresh portions of the liquid are brought under a sustained and regulated pressure in contact with the previously exhausted hides or skins, which operation has the effect of hastening the manufacture of the leather and rendering it more equable in quality.

What I claim therefore as my invention and desire to secure by Letters Patent is—

The method herein described of impregnating hides or skins with the required liquid by subjecting them to the action of a current of the liquid under a sustained and regulated pressure after they have been deprived of air by a preliminary exhaustion.

In testimony whereof I have hereunto subscribed my name.

THOS. T. FERGUSSON.

Witnesses:
JOHN HOOPE,
W. L. BENNEM.